March 13, 1945. F. D. WULFF 2,371,492
LAWN MOWER SHARPENER INCLUDING EQUALIZING MEANS
Filed March 6, 1944
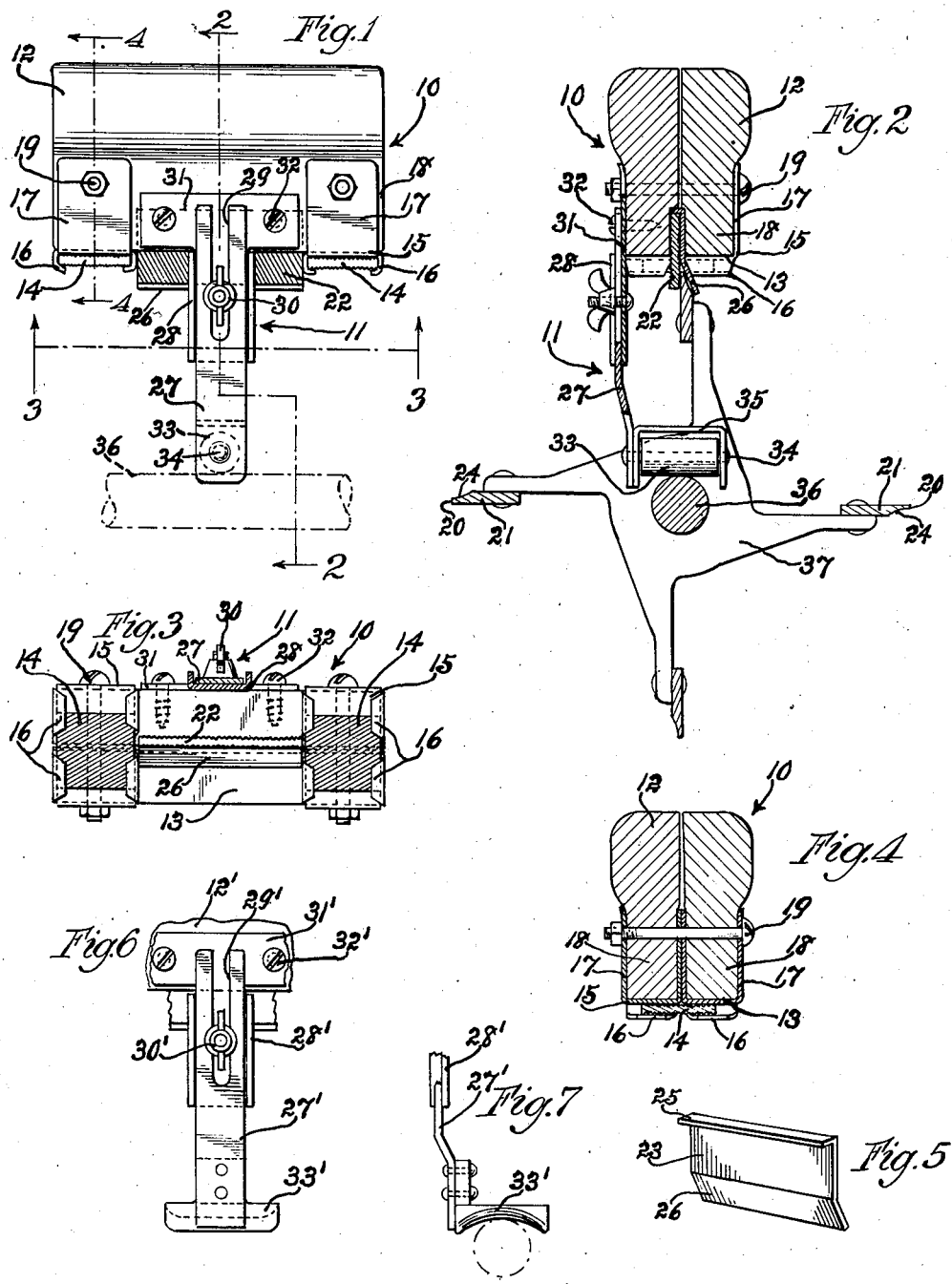
Inventor
Frank D. Wulff
by J. Daniel Stuwe
Attorneys.

Patented Mar. 13, 1945

2,371,492

UNITED STATES PATENT OFFICE 2,371,492

LAWN MOWER SHARPENER, INCLUDING EQUALIZING MEANS

Frank D. Wulff, Chicago, Ill.

Application March 6, 1944, Serial No. 525,142

8 Claims. (Cl. 76—82.1)

This invention relates to improvements in a law mower sharpener including equalizing means.

One of the essential objects of this invention is to provide an efficient device for sharpening lawn mower blades, which device is operable manually and is equipped with equalizing means effective for abrading or sharpening the edges of the several blades down evenly to an equal distance from the shaft located axially of said blades, so that all the blades will thereupon operate evenly and smoothly over the bed knife of the mower.

A further object of this invention is to provide an equalizing device mountable on a lawn mower blade sharpener and including means for travelling on the shaft located centrally of the blades, to equalize the sharpened edges of the blades relative to said shaft.

Another object of this invention is to provide such an equalizing device which is detachably and readily mountable on such a sharpener, so as to be usable with sharpeners of various constructions; and which is furthermore adjustable for length, so as to be adapted for use on mowers of different sizes.

These and various other objects and advantages are attained with this invention, as will become apparent from the following description, taken in connection with the accompanying drawing wherein the invention is illustrated in its preferred form, it being evident that other arrangements and forms of construction may be resorted to in carrying out the objects and purposes of this invention.

In the drawing:

Fig. 1 is a side view of my improved sharpener together with my novel equalizer mounted thereon, being shown in connection with the shaft located centrally of the mower blades.

Fig. 2 is a sectional view thereof, taken on line 2—2 of Fig. 1, showing also the mower blades and the supporting brackets on said central shaft, with the travelling element of the equalizer bearing on the shaft.

Fig. 3 is partly an inverted plan view and partly a sectional view, taken on line 3—3 of Fig. 1.

Fig. 4 is a sectional view, taken on line 4—4 of Fig. 1.

Fig. 5 is a perspective view of the guide member, which is instrumental in guiding the sharpener and pressing its projecting file closely against the side of the mower blade for removing any burr formed on the table.

Fig. 6 is a side view showing the equalizer equipped with a modified form of travelling element thereon, a slidable element instead of a rotary one.

Fig. 7 is an end view of this modified form of construction.

This invention, as illustrated herein, comprises the sharpening device 10, and the equalizing means 11 mounted thereon and combined therewith, to guide the sharpener and to equalize its sharpening effect on the several blades so as to sharpen their edges down to an equal distance from their central axis.

The disclosed sharpener 10 comprises a main member 12 which has its upper part formed as a handle, to fit the hand for convenient manual operation, and it has a flat lower face 13 whereon the abrading members are mounted. Said member 12 is preferably made in two parts or halves, as shown, for convenience in assembling and in replacing the various parts and members of this sharpener.

The abrading members utilized herein may be of various forms and materials, and they are illustrated as comprising a pair of files 14, which are each mounted on the face 13 by a pair of bracket members 15 including lower lips 16 which are bent over to clasp and frictionally hold the file in place; and said members have upper flanges 17 which embrace the lower portion 18 of a half part of the handle therebetween. A screw or bolt 19 is extended thru the two handle halves and thru the flanges 17, for securely holding them together, but enabling separation for replacements and repairs. The two files are thus mounted spaced apart under said face 13, and they are utilized for acting on the narrow outer edge 20 of the mower blade 21, as illustrated herein.

The abrading members of this sharpener also include a file 22 which is mounted in a notch provided between the two handle portions 18, and it is positioned between these two spaced files 14. Said file 22 projects a short distance from the face 13 and beyond said files 14, and it is adapted to act on the side of the mower blade 21 adjacent the edge, to remove any burr that may be formed thereon.

A guide member 23 is also provided with this sharpener, which includes means to engage the beveled part 24 adjacent the outer edge 20 of the blade; and said member is shown herein in the shape of a plate having a part extending alongside the file 22 and including an inner anchoring toe 25 and an outer guide portion 26 which extends at a slant away from the face 13 and the file 22. By this arrangement the beveled part 24 of the mower blade will fit snugly between said slanting portion 26 and said file 22 during the sharpening operation, and this portion 26 due to its slanting position is then instrumental in urging the mower blade over against the file 22 for highly effective action thereby.

This construction and mounting of my abrading members thus provides that all of said members can be reversed readily, and the members 14 can also be moved lengthwise in their brackets, so as to provide for convenient adjustment of these members or files and to bring different parts thereof into use for the sharpening operation.

The equalizing means 11 illustrated herein comprises a member which is mounted on the sharpener, and it is preferably detachably mounted thereon and is arranged so as to be attachable to various forms of lawn mower blade sharpeners. It is shown in the form of an extensible arm of two parts 27 and 28 which are adjustably connected so as to be varied in length, as by the use of a slot 29 and a wingnut 30. The part 28 is provided with bracket means or ears 31 which are detachably mounted on the side of the sharpener member 12, as by screws 32; while the part 27 carries on its lower end a travelling element 33, which is shown as a rotary member or roller rotatable on a shaft 34 and braced by a yoke 35. This roller is adapted to travel on the axle or shaft 36 which is located axially or centrally of the set of blades 21 and forms the axis of said blades and of their brackets 37 which carry the blades.

In the modified form of equalizing means disclosed in Figs. 6 and 7 of the drawing, a slidable element or sled runner 33' is used in place of the roller 33 disclosed in the preceding form. Otherwise the several members of this equalizer are substantially like the ones disclosed above, including a lower arm 27' at the lower end of which said runner 33' is secured, and also an upper arm part 28' which is adjustably connected to the part 27', by the slot 29' and the nut 30'; while the part 28' includes the ears 31' that are secured to the sharpener member 12', preferably detachably by means of threaded element 32', as indicated in the drawing.

This novel equalizing device has been disclosed herein as used in connection with my improved form of blade sharpener; but it is readily apparent that this equalizer can be utilized in connection with various other forms of lawn mower blade sharpeners, by simply connecting its bracket part 31 to a suitable part of such sharpener.

I claim:

1. A lawn mower sharpener comprising a member adapted to be operated by hand and carrying means for abrading the edge of the mower blade in a plane tangential to a circle concentric with the axis of the shaft carrying the blade and also the side of the blade adjacent said edge, and equalizing means having an arm connected with and at a normal to said member and including a part extending laterally of said arm to travel on the shaft located axially of the mower blades, whereby to guide the sharpener during its operation and even-up the distances of the edges of the several blades from said shaft.

2. A lawn mower blade sharpener comprising a supporting member adapted to be operated by hand and being provided with abrading means to act on the edge of the blade in a plane tangential to a circle concentric with the axis of the shaft carrying the blade and other abrading means to act on the side of the blade adjacent said edge, means adjacent the latter abrading means to guide the sharpener properly on the blade edge, and equalizing means having an arm mounted on said member and including an element extending laterally from said arm adapted to travel on the shaft located axially of the several blades, for equalizing the distance of the edges of the several blades from said shaft.

3. A lawn mower blade sharpener comprising a supporting member operable manually and carrying on one side thereof abrading means for acting on the edge of the blade and other abrading means for acting on the side of the blade adjacent said edge, guide means shaped to guide the sharpener properly along the beveled edge part of the blade, and equalizing means including an arm extending from said member, being adjustable for length to suit different sized mowers and carrying at its outer end an element to travel on the shaft located centrally of the blades, whereby to guide the sharpener during operation for evening-up the distances of the several sharpened blade edges radially from said shaft and provide a smoothly cutting mower.

4. A lawn mower blade sharpener comprising a supporting member arranged to be operated by hand and carrying on one side thereof several abrading members spaced apart, for acting on the edge of the blade, abrading means positioned between said spaced members for acting on the side of the blade adjacent the edge, said abrading means and members being adjustably mounted for bringing different parts thereof into active position, guide means for guiding the sharpener in a proper position along the blade edge, and equalizing means carried by said supporting member and having on its outer end an element for traveling on the shaft located centrally of the blades, whereby to guide the sharpener and even-up the distances of the edges of the several blades radially from the shaft.

5. A lawn mower blade sharpener comprising a supporting member shaped to be operated by hand and carrying on one side a pair of files spaced apart, for acting on the edge of the blade, a file positioned between said spaced files and projecting beyond them, for acting on the side of the blade adjacent said edge, means adjustably mounting said files to bring different parts thereof into active position, guide means adjacent the projecting file and cooperating therewith for guiding the sharpener properly on the blade, and equilizing means including an arm extending from said supporting member, being adjustable for length and carrying on its outer end an element adapted to travel upon the shaft located axially of the several blades, for equalizing the distances of the sharpened edges of the several blades from said shaft.

6. An equalizing device for a lawn mower blade sharpener which carries abrading means to act on the edge of the blade in a plane tangential to a circle concentric with the axis of the shaft carrying the blade and on the side of the blade adjacent the edge, said device comprising an arm shaped to have one end part mounted on the sharpener at a normal to said means and to be adjustable for length, said arm carrying at its outer end an element extending laterally from said arm and shaped to travel lengthwise of the shaft located axially of the blades during the sharpening operation, whereby to guide the sharpener for evening-up the edges of the several blades to an equal distance from said shaft.

7. An equalizing device for a lawn mower blade sharpener which includes abrading means to act on the edge and on the side of the blade in a plane tangential to a circle concentric with the axis of the shaft carrying the blade, said device comprising an arm adjustable for length and having at one end bracket means mountable on the side of and at a normal to said means, and an element provided laterally of said arm and at the outer end of the arm shaped and arranged for traveling upon the shaft located axially of the blades, for automatically equalizing the distances of the edges of the several blades from said shaft by the sharpening operation.

8. An equalizing device for a lawn mower blade sharpener which is manually operable and carries thereon abrading means to act on the edge of the blade in a plane tangential to a circle concentric with the axis of the shaft carrying the blade and other abrading means to act on the side of the blade, an equalizing device comprising an arm composed of two parts which are connected to be adjustable for length, to be adapted for mowers of different sizes, bracket means on the end of one of said parts for detachably mounting the arm on a side of and at a normal to said abrading means to extend therefrom, and an element on the outer end of the other arm part and extending laterally thereof for traveling lengthwise on the shaft located centrally of the mower blades, whereby this device will guide the sharpener during operation to automatically equalize the distances of the several blades from said shaft.

FRANK D. WULFF.